(12) United States Patent
Sathyanarayana

(10) Patent No.: US 8,175,368 B2
(45) Date of Patent: *May 8, 2012

(54) SYSTEMS AND METHODS FOR IMAGE SEGMENTATION WITH A MULTI-STATE CLASSIFIER

(75) Inventor: Shashidhar Sathyanarayana, Union City, CA (US)

(73) Assignee: Scimed Life Systems, Inc., Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,764

(22) Filed: May 11, 2011

(65) Prior Publication Data

US 2011/0211745 A1 Sep. 1, 2011

Related U.S. Application Data

(63) Continuation of application No. 12/716,818, filed on Mar. 3, 2010, now Pat. No. 7,965,876, which is a continuation of application No. 11/099,747, filed on Apr. 5, 2005, now Pat. No. 7,680,307.

(51) Int. Cl.
*G06K 9/00* (2006.01)
(52) U.S. Cl. ........ 382/132; 128/920; 128/921; 128/922; 128/923; 128/924; 356/39; 356/40; 356/41; 356/42; 356/43; 600/407; 600/408; 600/409; 600/410; 600/411; 345/581; 345/582; 345/583; 345/584; 345/585
(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 4,760,604 A | 7/1988 | Cooper et al. |
| 4,858,124 A | 8/1989 | Lizzi et al. |
| 4,982,339 A | 1/1991 | Insana et al. |
| 5,260,871 A | 11/1993 | Goldberg |

(Continued)

FOREIGN PATENT DOCUMENTS

WO   02059828   8/2002

(Continued)

OTHER PUBLICATIONS

Lin, Y., "Support Vector Machines and the Bayes Rule in Classification," 2002, Data Mining and Knowledge Discovery, 6, 2002, Kluwer Academic Publishers, Manufactures in the Netherlands, pp. 259-275.

(Continued)

*Primary Examiner* — Atiba O Fitzpatrick
(74) *Attorney, Agent, or Firm* — Frommer Lawrence & Haug LLP; Bruce E. Black

(57) ABSTRACT

The systems and methods described herein provide for fast and accurate image segmentation through the application of a multi-stage classifier to an image data set. An image processing system is provided having a processor configured to apply a multi-stage classifier to the image data set to identify a distinctive region. The multi-stage classifier can include two or more component classifiers. The first component classifier can have a sensitivity level configured to identify one or more target regions in the image data set and the second component classifier can have a specificity level configured to confirm the presence of the distinctive region in any identified target regions. Also provided is a classification array having multiple multi-stage classifiers for identification and confirmation of more than one distinctive region or for the application of different classification configurations to the image data set to identify a specific distinctive region.

20 Claims, 5 Drawing Sheets

U.S. PATENT DOCUMENTS

| | | | |
|---|---|---|---|
| 5,363,850 | A | 11/1994 | Soni et al. |
| 5,745,601 | A | 4/1998 | Lee et al. |
| 5,903,664 | A | 5/1999 | Hartley et al. |
| 5,963,664 | A | 10/1999 | Kumar et al. |
| 5,982,917 | A | 11/1999 | Clarke et al. |
| 5,987,094 | A | 11/1999 | Clarke et al. |
| 6,263,092 | B1 | 7/2001 | Roehrig et al. |
| 6,266,435 | B1 | 7/2001 | Wang |
| 6,477,262 | B2 | 11/2002 | Wang |
| 6,494,720 | B1 | 12/2002 | Meyrowitsch |
| 6,549,646 | B1 | 4/2003 | Yeh et al. |
| 6,564,176 | B2 | 5/2003 | Kadtke et al. |
| 6,574,357 | B2 | 6/2003 | Wang |
| 6,757,412 | B1 | 6/2004 | Parsons et al. |
| 6,776,760 | B2 | 8/2004 | Marmarelis |
| 2001/0031076 | A1 | 10/2001 | Campanini et al. |
| 2002/0076091 | A1 | 6/2002 | Wang |
| 2004/0066881 | A1 | 4/2004 | Reddy et al. |
| 2005/0043614 | A1 | 2/2005 | Huizenga et al. |
| 2005/0110802 | A1 | 5/2005 | Avinash |
| 2007/0165916 | A1 | 7/2007 | Cloutier et al. |

FOREIGN PATENT DOCUMENTS

| | | |
|---|---|---|
| WO | 2004017835 | 3/2004 |

OTHER PUBLICATIONS

Lin, J.S. et al., "Reduction of False Positives in Lung Node Detection Using a Two-Level Neural Cassification," IEEE Transactions on Medical Imaging, vol. 15, No. 2, Apr. 1, 1996, pp. 206-217.

Sun, Y. et al., "Full-Field Mammogram Analysis Based on the Identification of Normal Regions," IEEE International Symposium on Biomedical Imaging: Macro to Nano, 2004, Arlington, VA, Apr. 15-18, 2004, pp. 1131-1134.

Grabowski, S., "A Family of Cascade NN-Fike Classifiers" CADM 2003. The Experience of Designing and Application of CAD Systems in Microelectronics, Proceedings of the VIIth International Conference Feb. 18-22, 2003, Piscataway, NJ, IEEE pp. 203-206.

Smutek, D. et al., "Imagine Texture Analysis of Sonograms in Chronic Inflammations of Thyroid Gland," Ultrasound in Medicine and Biology, New York, NY, vol. 29, No. 11, Nov. 2003, pp. 1531-1543.

International Search Report and Written Opinion for International Patent Application No. PCT/US2006/012213 mailed Sep. 15, 2006.

International Preliminary Report on Patentability for International Patent Application No. PCT/US2006/012213 mailed Oct. 18, 2007.

Office Communication for U.S. Appl. No. 11/099,747 mailed Apr. 29, 2008.

Office Communication for U.S. Appl. No. 11/099,747 mailed Nov. 25, 2008.

Office Communication for U.S. Appl. No. 11/099,747 mailed Apr. 1, 2009.

Office Communication for U.S. Appl. No. 11/099,747 mailed Oct. 20, 2009.

Office Communication for U.S. Appl. No. 12/716,818 mailed Sep. 2, 2010.

Office Communication for U.S. Appl. No. 12/716,818 mailed Nov. 26, 2010.

Office Communication for U.S. Appl. No. 12/716,818 mailed Feb. 17, 2011.

SYSTEMS AND METHODS FOR IMAGE SEGMENTATION WITH A MULTI-STATE CLASSIFIER

CROSS-REFERENCE TO RELATED APPLICATION

The present patent application is a continuation of U.S. patent application Ser. No. 12/716,818 filed Mar. 3, 2010, which is a continuation of U.S. patent application Ser. No. 11/099,747, filed on Apr. 5, 2005, all of which are incorporated herein by reference.

FIELD OF THE INVENTION

The field of the systems and methods described herein relates generally to the use of classifiers in image processing and, more particularly, to the use of a multi-stage classifier to identify and confirm the presence of a distinctive region.

BACKGROUND INFORMATION

Classifiers are used in image processing to classify a given pixel or region within a set of image data into one of a limited number of predefined categories. Classifiers have been successfully employed in the field of medical image processing, specifically in the effort to classify different categories of tissue in medical images. For instance, in intravascular ultrasound (IVUS) imaging, classifiers are applied to blood vessel images to distinguish between various tissue types such as vulnerable plaque, blood and calcified tissue. The process of classifying image regions into the appropriate categories is referred to as image segmentation.

Typically, classifiers are generic computational procedures that are customizable for a given classification problem. Examples of classifier methodologies include, but are not limited to, Bayesian classifiers, k-nearest neighbor classifiers and neural network classifiers. Examples of previous classification techniques are set forth in the following patents, each of which are incorporated herein by reference: U.S. Pat. No. 6,757,412 issued to Parsons et al., which describes a tissue classification technique based on thermal imaging; U.S. Pat. Nos. 6,266,435, 6,477,262 and 6,574,357 issued to Wang, which describe tissue diagnosis and classification based on radiological imaging and U.S. Pat. No. 5,260,871 issued to Goldberg, which describes neural network tissue classification based on ultrasound imaging, Classifiers can be customized to identify the presence of a particular distinctive region. The customization process is referred to as training and is accomplished by providing a large number of exemplary images of the distinctive region to the generic classifier. The classifier extracts features associated with each image and learns the association between the feature and the known distinctive region. Once the training phase is complete, the classifier can be used to classify regions within new images by extending the previously learned association.

In most practical applications, the classifier output is at best correct only in a statistical sense. Given the very large number of potential image patterns that can be encountered, the design of an accurate classifier, i.e., a classifier that is capable of properly identifying the distinctive region when present while at the same time properly distinguishing the distinctive region from other regions having a similar appearance, can be very difficult. Furthermore, these complex classifiers can consume significant processing resources in their implementation, which can hinder data processing times and real-time imaging procedures.

Accordingly, there is a need for reduced complexity classifiers capable of achieving a high accuracy rate.

SUMMARY

The systems and methods described herein provide for fast and accurate image segmentation. In one example embodiment, an image processing system is provided with a processor configured to apply a multi-stage classifier to an image data set. The multi-stage classifier includes at least two component classifiers that are configured to identify a distinctive region within the image data set. The first component classifier preferably has a sensitivity level confirmed to identify a subset of the image data set corresponding to one or more target regions. The second component classifier preferably has a specificity configured to confirm the presence of the desired distinctive region within the subset. The processor can also apply a classifier array to the image data set, where the classifier array includes two or more multi-stage classifiers. Each multi-stage classifier within the array can be applied to the image data set concurrently. Each multi-stage classifier can be configured to identify a separate distinctive region or the same distinctive region, according to the needs of the application. The component classifier can implement any type of classification methodology and can have any level of sensitivity or specificity. Preferably, the first component classifier has a relatively high sensitivity while the second component classifier has a relatively high specificity.

Also provided is an example method of classifying an image data set. In one example, the method includes applying a first classifier to the image data set, where the first classifier has a sensitivity configured to identify a subset of the image data set corresponding to one or more target regions. The method then includes applying a second classifier to any identified target regions, where the second classifier has a specificity configured to confirm the presence of a distinctive region. In one embodiment, the sensitivity and specificity levels can be adjusted by a user.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention not be limited to the details of the example embodiments.

BRIEF DESCRIPTION OF THE FIGURES

The details of the invention, including fabrication, structure and operation, may be gleaned in part by study of the accompanying figures, in which like reference numerals refer to like segments.

DETAILED DESCRIPTION

The systems and methods described herein provide for fast and accurate image segmentation through the application of multiple component classifiers to an image data set. In a preferred embodiment, the multi-stage classifier includes two component classifiers that are applied to an image data set sequentially to identify the desired distinctive region. The first component classifier has a sensitivity level configured to identify target regions in the image data set that are similar to the desired distinctive region, or share features or characterizations with the desired distinctive region. The second component classifier has a specificity level configured to identify the presence of the desired distinctive region among the target regions. A classifier having two component classifiers such as these can be referred to as a "senspec classifier."

As used herein, sensitivity refers to the ability of the classifier to detect the distinctive region when it is present, while specificity refers to the ability of the classifier to correctly state that the distinctive region is present in cases when it is indeed present. For instance, in an application where vulnerable plaque is the desired distinctive region, a highly sensitive classifier will identify and flag even mildly suspicious regions of the image that can be construed as vulnerable plaque, even though the region may be some other tissue type. Thus, a highly sensitive classifier is likely to generate false positives. Conversely, a highly specific classifier is more discriminating, and will only flag a region if it determines with a high degree of certainty that the region is in fact vulnerable plaque. Thus, a highly specific classifier is less likely to generate false positives.

Figure 1:
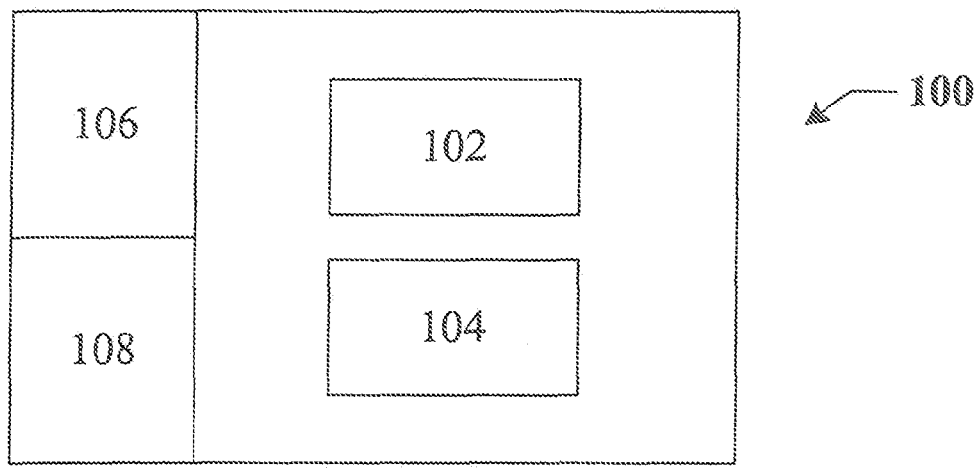
FIG. 1 is a block diagram depicting an example embodiment of an image processing system.

FIG. 1 depicts an example embodiment of an image processing system 100 for application of the component classifiers described herein. Preferably, image processing system 100 includes memory unit 102 for storing an image data set and processor unit 104 for carrying out the processing functions of system 100. System 100 also includes a data interface 106 for communication with components external to system 100 as well as an optional user interface 108.

Figure 2:
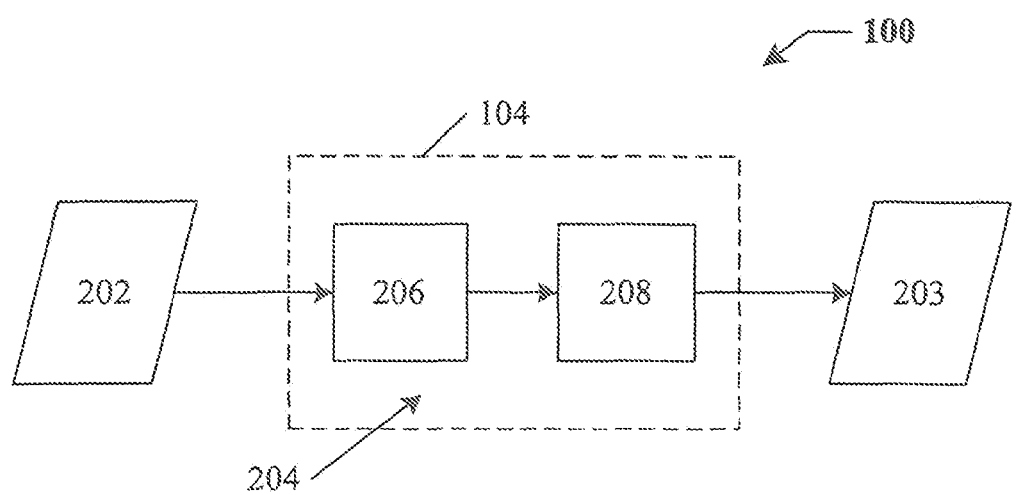
FIG. 2 is a block diagram depicting an example embodiment of a multi-stage classifier.

FIG. 2 depicts a block diagram of an example classification method used to classify an image data set 202 within image processing system 100. Image data set 202 can include image data acquired from any source using any type of acquisition device. Image data set 202 is input to processor 104 where multi-stage classifier 204 can be applied. In this embodiment, multi-stage classifier 204 includes two component classifiers 206 and 208, although more than two component classifiers can be used. Each component classifier 206 and 208 is preferably applied sequentially in separate stages, with component classifier 206 being applied to image data set 202 first. Component classifier 206 has a sensitivity level configured to identify one or more target regions, or pixels, that are similar to the desired distinctive region. These target regions are then output to second component classifier 208, which is configured to confirm the presence of the distinctive region among the target regions, or indicate that the distinctive region is absent. This process can then be repeated for as many different distinctive regions as desired. Processor 104 can then output the final classified image data set 203. Second component classifier 208 is preferably configured to confirm the presence of the distinctive region with a degree of accuracy and certainty sufficient for the needs of the application. For instance, as discussed below, component classifier 208 is not required to confirm the presence of the distinctive region with 100% accuracy.

Figure 3A:
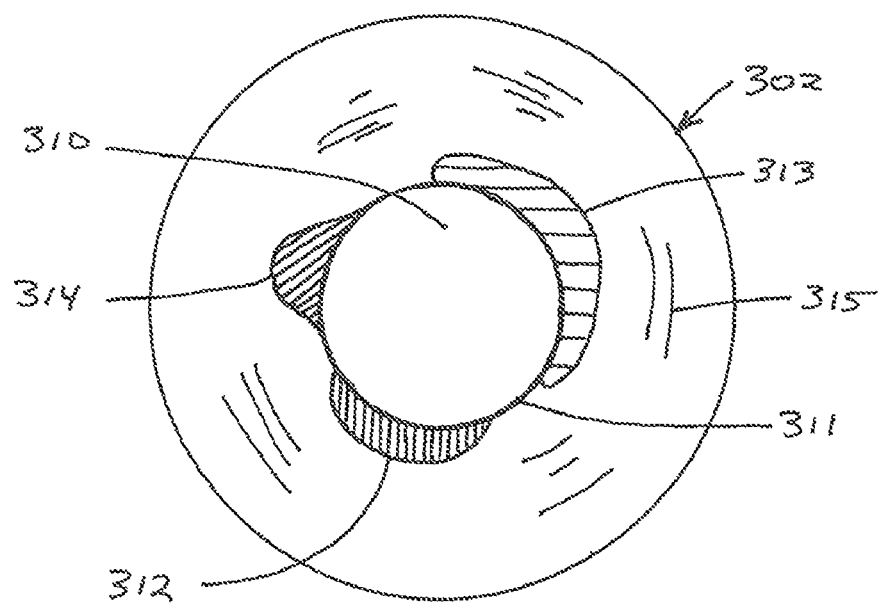
FIG. 3A depicts an example ultrasound image prior to application of a multi-stage classifier.
Figure 3B:
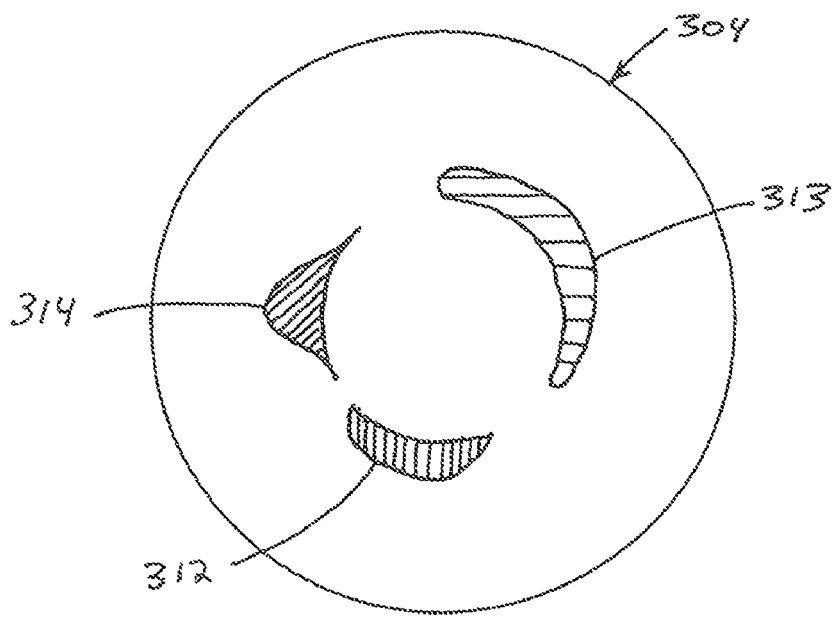
FIG. 3B depicts an example ultrasound image after application of an example embodiment of a first component classifier.

FIGS. 3A-B depict example images 302 and 304, which serve to further illustrate the systems and methods described herein. In this example, image 302 is an ultrasound image of the interior of a blood vessel, similar to that acquired using an intravascular ultrasound (IVUS) imaging system, an intracardiac echocardiography (ICE) imaging system or other similar imaging system. It should be noted that ultrasound imaging is used herein only as an example and, in fact, the systems and methods described herein can be used with any type of imaging system, including a light based system using optical coherence tomography, etc.

Image 302 shown in FIG. 3A represents an acquired image data set 202 prior to application of component classifiers 206 and 208. Here, the distinctive region is vulnerable plaque region 314, which is shown amongst multiple other tissue regions, such as blood region 310, vessel wall region 311, calcified tissue regions 312 and 313 and noise-induced regions 315, which do not correspond directly to a tissue type but instead result from background noise, scattered echoes and the like. First component classifier 206 is preferably applied to image 302 to generate positive flags for any image regions it determines are target regions, e.g., regions that have one or more characteristics of the distinctive region or that fall within the range of image patterns that could be construed as the distinctive region. For instance, in this example classifier 206 may identify vulnerable plaque region 314 as well as calcified tissue regions 312 and 313 as target regions. The subset of image data set 202 corresponding to the target regions is then preferably passed to component classifier 206.

FIG. 3B depicts image 304, which shows the target regions identified by classifier 206 that are then passed to second component classifier 208 for analysis. Only the target regions of image 302 are passed to classifier 208, as opposed to passing the entire image 302. This reduces the size of the image data set that requires analysis by second classifier 208, which in turn reduces the processing burden placed on system 100. It should be noted, however, that any or all portions of image 302 can be passed according to the needs of the application. Component classifier 208 then analyzes the target regions 312-314 passed from component classifier 206 and preferably identifies region 314 as the desired distinctive region, successfully distinguishing it from the false positive regions 312 and 313.

Image data set 202 can be in any desired data format when component classifiers 206 and 208 are applied. For instance, although this example makes use of visual images 302 and 304 to illustrate the application of component classifiers 206 and 208 to image data set 202, image data set 202 is not required to be in a displayable format such as this before classification can occur. The data format of image data set 202 to which multi-stage classifier 204 is applied is dependent on the needs of the application.

By dividing the classification process into a multiple stage procedure involving more than one classifier, the requirements placed on each component classifier 206 and 208 are reduced. This allows the implementation of component classifiers that are less complex, which can translate into increased processing speed. Preferably, each component classifier 206 and 208 is designed to accomplish a separate classification related goal, thereby allowing more focus in the design and implementation of each classifier.

For instance, in the embodiments described above with respect to FIGS. 2 and 3A-B, the first component classifier 206 is a highly sensitive classifier, designed and implemented with the goal of identifying the distinctive region as a target region if it is indeed present, and minimizing the chance that the distinctive region will be missed. The second component classifier 208 is a highly specific classifier, designed and implemented with the goal of distinguishing between the target regions to properly identify the distinctive region, or indicate that the distinctive region is absent. It should be noted that component classifiers 206 and 208 can also be interchanged, such that the first classifier is highly specific and the second component classifier is highly sensitive, in accordance with the needs of the application.

Figure 4:
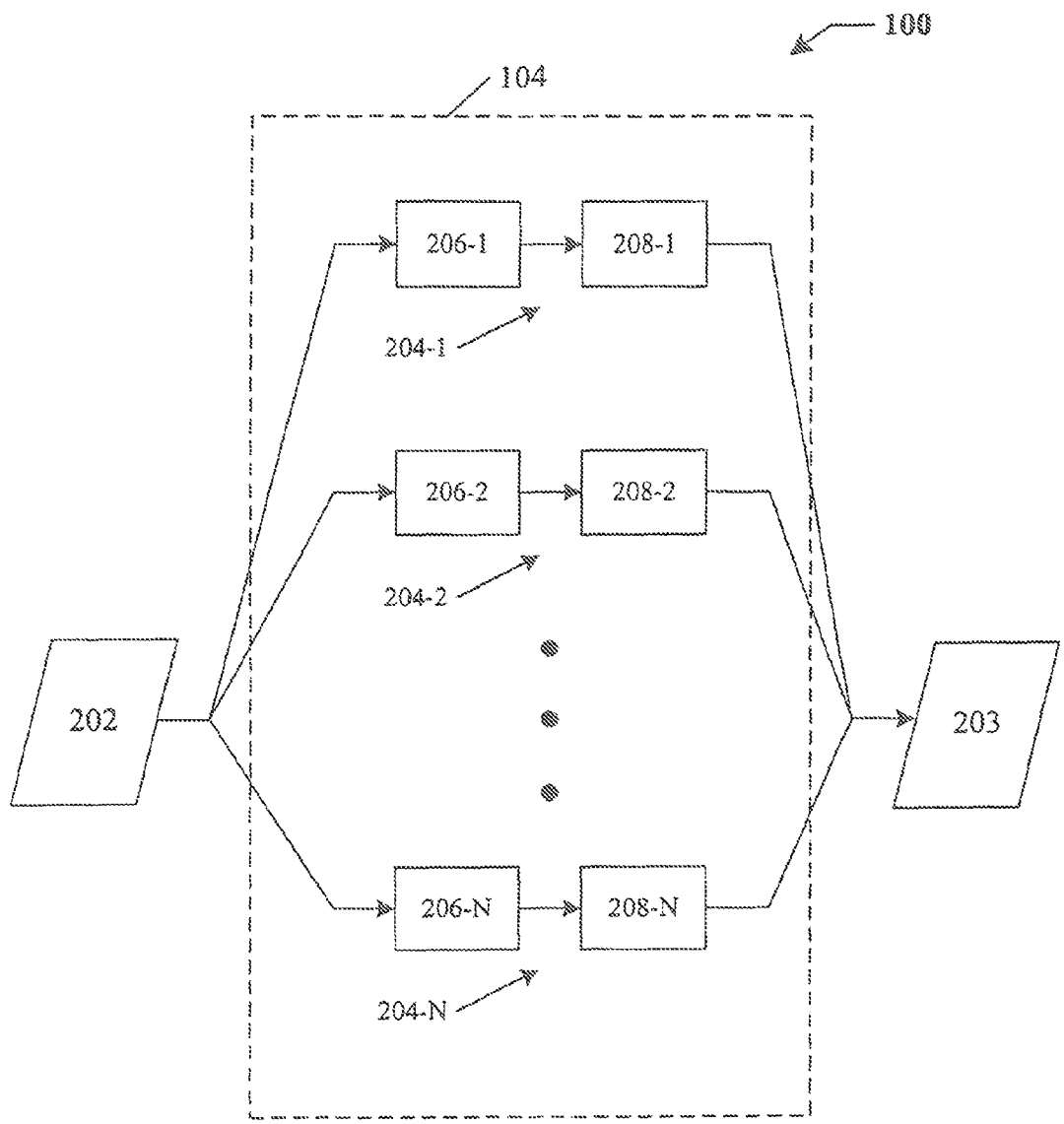
FIG. 4 is a block diagram depicting an example embodiment of a classifier array.

Although the embodiments described above with respect to FIGS. 2 and 3A-B involve one multi-stage classifier 204, more than one multi-stage classifier 204 can be used according to the needs of the application. FIG. 4 depicts an example embodiment of image processing system 100 configured to apply an array 402 of multi-stage classifiers 204 to image data set 202. In this embodiment, each multi-stage classifier 204 includes two component classifiers 206 and 208 and is configured to identify a specific distinctive region. Array 402 can include any number of multi-stage classifiers 204, indicated by reference numbers 204-1 through 204-N, 206-1 through 206-N and 208-1 through 208-N, where N can be any number. Preferably, there is a multi-stage classifier 204 for every distinctive region desired to be identified. For instance, in one example embodiment there may be three distinctive regions, such as vulnerable plaque, occlusive plaque and calcified tissue. Three multi-stage classifiers 204 can then be used in array 402, one for each distinctive region, with component classifiers 206 and 208 within each set configured to identify the appropriate distinctive region and distinguish it from the other tissue types.

Preferably, after image data set 202 is input to processor 104, each of the multi-stage classifiers 204 are applied to image data set 202 concurrently, in parallel to minimize the processing time necessary to complete the image segmentation. However, it should be noted that each multi-stage classifier 204 can be applied at different times, in a staggered approach, or each multi-stage classifier 204 can be applied sequentially, depending on the needs of the particular application.

In another embodiment, each multi-stage classifier 204 in array 402 is configured to identify the same distinctive region, but the component classifiers 206-1 through 206-N and/or 208-1 through 208-N used in each multi-stage classifier 204 have varying designs. In this manner, the overall accuracy of system 100 can be increased by applying more than one multi-stage classifier 204 and then segmenting the image data set 202 based on the results of any one multi-stage classifier 204, an average of all the multi-stage classifiers 204 or any other combination in accordance with the needs of the application. For instance, each multi-stage classifier 204 in the array 402 can be implemented with a different classifier type, such as Bayesian classifiers, k-nearest neighbor classifiers, neural network classifiers or any other classifier type. In another embodiment, each component classifier 206-1 through 206-N or 208-1 through 208-N in the array 402 can be implemented with a different sensitivity or specificity setting, respectively. One of skill in the art will readily recognize that numerous configurations of array 402 exist and, accordingly, the systems and methods described herein should not be limited to any one configuration.

The sensitivity and specificity levels used in component classifiers 206 and 208 are dependent on the needs of the application. Preferably, the sensitivity level of classifier 206 is set at a relatively high level to detect the distinctive region whenever present with a sufficiently high accuracy rate for the application. In determining the sensitivity level of component classifier 206, one preferably should balance the ability to achieve this accuracy rate with the computation time and resources needed to achieve the accuracy rate, as well as the desire to maintain the generation of false positives at a minimum and the desire to limit the number of target regions passed to second component classifier 208 in order to minimize the computational requirements placed on system 100. As a result, the designer may concede that a certain limited number of distinctive region incidences will go undetected.

Likewise, the specificity level of classifier 208 is preferably set at a relatively high level to detect whether the distinctive region is present with a sufficiently high accuracy rate for the application. In determining the specificity level of component classifier 208, one preferably should balance the ability to achieve this accuracy rate with the computational time and resources necessary to achieve the accuracy rate, as well as the ability to distinguish the distinctive region from any false positive regions. As a result, the designer may concede that a certain limited number of distinctive region incidences will be misidentified or improperly stated as absent.

Image processing system 100 can be configured to allow the user to adjust the sensitivity, specificity or any other classifier setting of the multi-stage classifier 204. This can be accomplished through user interface 108 depicted in FIG. 1. The ability to adjust the sensitivity and specificity would allow the user to make real time changes to the segmented image to account for a noise filled environment, differences in image acquisition equipment, variations in tissue appearance between patients and the like.

Figure 5:
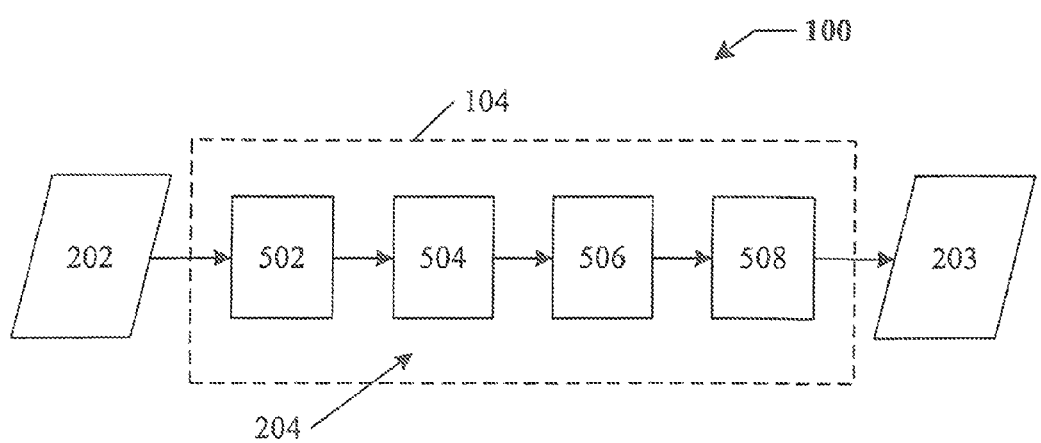
FIG. 5 is a block diagram depicting another example embodiment of a multi-stage classifier.

As mentioned above, multi-stage classifier 204 can also include more than two component classifiers. FIG. 5 depicts multi-stage classifier 204 having 4 component classifiers 502-508. Each component classifier 502-508 can be configured in any manner according to the needs of the application. For instance, each component classifier 502-508 could be implemented using a different classification methodology such as Bayesian, k-nearest neighbor, neural network and the like.

In this embodiment, component classifiers 502-508 are configured with different sensitivity and specificity level as well as different classification methodologies. For example, first component classifier 502 has a relatively high sensitivity level, second component classifier 504 has a relatively moderate sensitivity level and a relatively moderate specificity level, and each of third and fourth classifiers 506 and 508 has a relatively high specificity level but implements a different classification methodology. Because the complexity of a component classifier generally increases along with the level of sensitivity/specificity, the use of multiple component classifiers 502-508 having a combination of various sensitivity/specificity levels and/or classification methodologies can result in the consumption of lower computation times and design times in comparison to a single classifier having a relatively very high sensitivity/specificity level. One of skill in the art will readily recognize that a limitless number of configuration of component classifiers exist and, accordingly, the systems and methods described herein are not limited to any one configuration.

Figure 6:
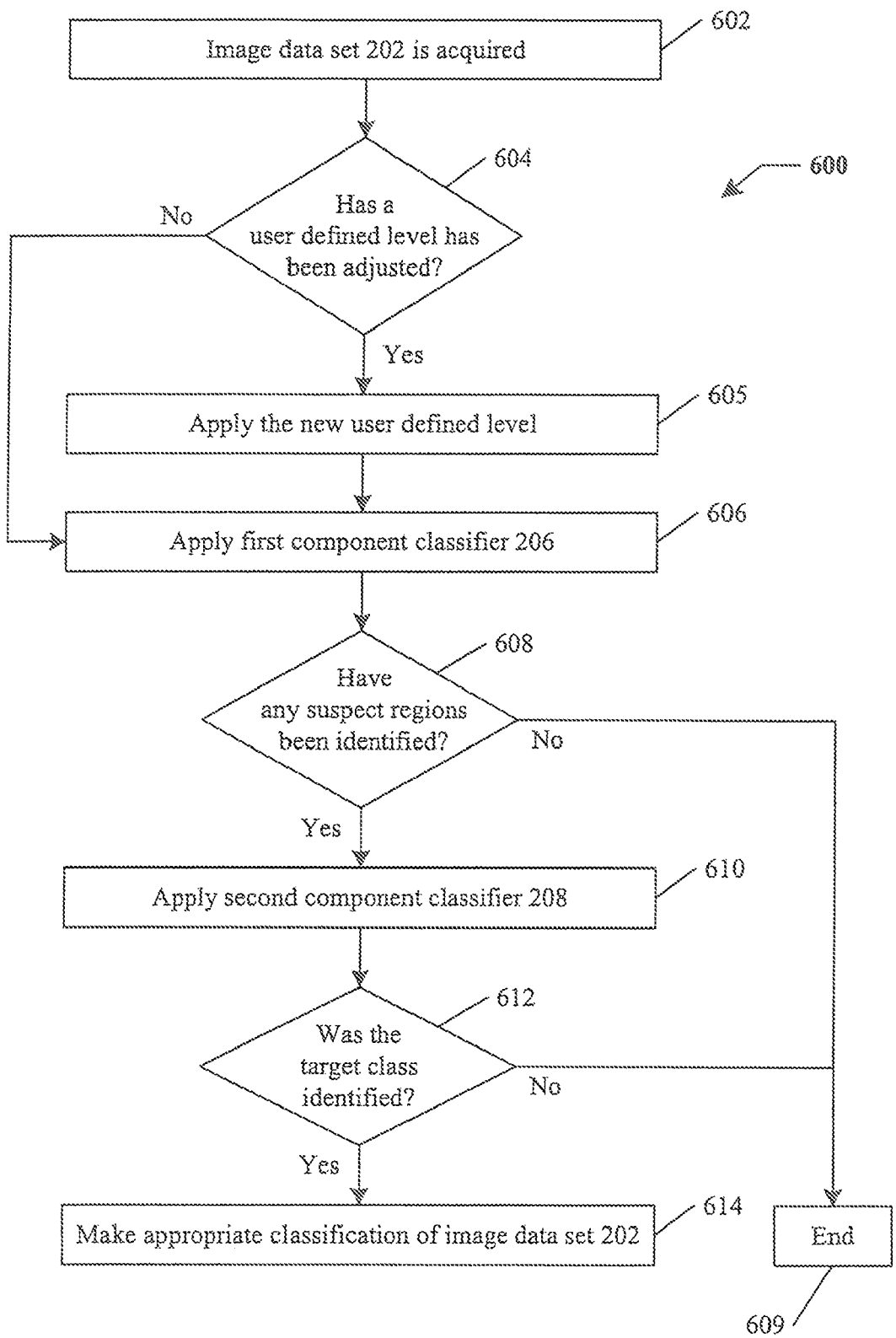
FIG. 6 is a flow diagram depicting an example method for identifying a distinctive region in an image data set.

FIG. 6 depicts an example embodiment of a method for identifying a distinctive region in image data set 202 using a user adjustable multi-stage classifier 204. At 602, image data set 202 is acquired and optionally stored in memory 102. At 604, system 100 determines if the user-defined sensitivity or specificity level has been adjusted. If so, system 100 applies the new level settings at 605. Next, at 606, first component classifier 206 is applied to image data set 202. Component classifier 206 preferably has a sensitivity configured to identify a subset of image data set 202 corresponding to one or more target regions. At 608, system 100 determines if any target regions were identified and, if so, passes the subset of data corresponding to these target regions to second component classifier 208. If no target regions were identified, the classification procedure can be terminated at 609. At 610, system 100 applies second component classifier 208 to the target regions. Component classifier 208 preferably has a specificity set to confirm the presence of the distinctive region. Then, at 612, system 100 determines whether the presence of the distinctive region was confirmed and, if so, makes the appropriate classification at 614. If the presence of the distinctive region was not confirmed, system 100 can terminate the procedure at 609.

The classification that occurs at 614 can be for any desired purpose. In an example IVUS imaging application, a visual indication of the distinctive region can be displayed in image data set 202. For example, any distinctive region regions can be color coded to be easily distinguished from the surrounding tissue regions. The visual indication can be applied to the real-time image to give the user real-time feedback regarding the presence or absence of the distinctive region.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. As another example, the order of steps of method embodiments may be changed. Features and processes known to those of ordinary skill may similarly be incorporated as desired. Additionally and obviously, features may be added or subtracted as desired. Accordingly, the invention is not to be restricted except in light of the attached claims and their equivalents.

What is claimed and desired to be protected by Letters Patent of the United States is:

1. A method for identifying a distinctive region in a medical image data set for a patient, comprising:
    acquiring a medical image data set of an interior of a blood vessel;
    applying an array of two or more multi-stage classifiers, wherein each of the multi-stage classifiers comprises a first classifier and a second classifier, to the medical image data set by
        applying the first classifier to the medical image data set, the first classifier having a sensitivity configured to identify a first subset of the medical image data set with one or more characteristics similar to a first specified distinctive region of the blood vessel,
        passing the identified first subset to the second classifier, and
        applying the second classifier to the first subset, the second classifier having a specificity configured to confirm the presence, or absence, of the first specified distinctive region within one or more portions of the first subset; and
    displaying a medical image based on the medical image data set and showing one or more first specified distinctive regions as identified by the multi-stage classifiers.

2. The method of claim 1, wherein acquiring a medical image data set comprises acquiring a medical data image set of an interior of a blood vessel obtained using an intravascular ultrasound imaging system.

3. The method of claim 1, wherein the first specified distinctive region is selected from an occlusive plaque region and a vulnerable plaque region.

4. The method of claim 1, wherein the sensitivity of the first component classifier is relatively higher than the sensitivity of the second classifier and the specificity of the second classifier is relatively higher than the specificity of the first classifier.

5. The method of claim 1, further comprising adjusting the sensitivity of the first classifier in real-time.

6. The method of claim 1, further comprising adjusting the specificity of the second classifier in real-time.

7. The method of claim 1, wherein acquiring a medical image data set comprises acquiring a medical data image set of an interior of a blood vessel obtained using an optical coherence tomography imaging system.

8. The method of claim 1, wherein the displayed medical image data is color coded to indicate the presence of the first specified distinctive region.

9. The method of claim 1, wherein the first subset comprises the entire medical image data set.

10. An image processing system configured to process a medical image data set for a patient, comprising:
    a memory configured to store a medical image data set of an interior of a blood vessel; and
    a processor configured to apply an array of two or more multi-stage classifiers to the medical image data set, wherein each of the multi-stage classifiers comprises a first classifier and a second classifier, the first classifier having a sensitivity configured to identify a first subset of the medical image data set with one or more characteristics similar to a plaque region in the blood vessel and the second classifier having a specificity configured to confirm the presence, or absence, of the plaque region in one or more portions of the first subset.

11. The image processing system of claim 10, wherein the sensitivity of the first classifier is relatively higher than the sensitivity of the second classifier and the specificity of the second classifier is relatively higher than the specificity of the first classifier.

12. The image processing system of claim 10, wherein the processor is further configured to format the medical image data set for display with a visual indication of the location of the plaque region in the medical image data set.

13. The image processing system of claim 10, wherein the medical image data set is from an intravascular ultrasound imaging system.

14. The image processing system of claim 10, wherein at least one of the multi-stage classifiers is designed to identify only a first type of biological region and at least another one of the multi-stage classifiers is designed to identify only a second type of biological region different from the first type, wherein the first type of biological region is the plaque region.

15. The image processing system of claim 10, wherein the medical image data set is from an optical coherence tomography imaging system.

16. An image processing system configured to process medical image data, comprising:
    a memory configured to store a medical image data set of an interior of a blood vessel; and
    a processor configured to apply an array of two or more multi-stage classifiers to the medical image data set, wherein each of the multi-stage classifiers comprises a first classifier and a second classifier, the first classifier having a sensitivity configured to identify a subset of the medical image data set with one or more characteristics similar to a specified biological region of the interior of the blood vessel, and the second classifier having a specificity configured to confirm the presence, or absence, of the specified biological region within the subset.

17. The image processing system of claim 16, wherein each multi-stage classifier is configured to identify a different type of biological region.

18. The image processing system of claim 16, wherein a plurality of the multi-stage classifiers are configured to identify the same type of biological region.

19. The image processing system of claim 16, wherein the processor is configured to apply each multi-stage classifier to the medical image data set concurrently.

20. The image processing system of claim 16, wherein the medical image data set is from an intravascular ultrasound imaging system or an optical coherence tomography imaging system.

* * * * *